(12) United States Patent
Houle (10) Patent No.: US 9,932,172 B2
(45) Date of Patent: Apr. 3, 2018

(54) VERSATILE CONTAINER AND PIPE

(71) Applicant: André Houle, St-Gérard-des-Laurentides (CA)

(72) Inventor: André Houle, St-Gérard-des-Laurentides (CA)

( * ) Notice: Subject to any disclaimer, the term of this patent is extended or adjusted under 35 U.S.C. 154(b) by 874 days.

(21) Appl. No.: 13/907,806

(22) Filed: May 31, 2013

(65) Prior Publication Data

US 2014/0352633 A1 Dec. 4, 2014

(51) Int. Cl.
| | | |
|---|---|---|
| *F16L 19/00* | (2006.01) | |
| *B65D 90/50* | (2006.01) | |
| *F24H 9/00* | (2006.01) | |
| *B65D 51/00* | (2006.01) | |
| *B65D 88/00* | (2006.01) | |
| *F28D 20/00* | (2006.01) | |

(52) U.S. Cl.
CPC ............. *B65D 90/50* (2013.01); *B65D 51/00* (2013.01); *B65D 88/00* (2013.01); *F24H 9/0021* (2013.01); *F28D 20/0034* (2013.01); *Y02E 60/142* (2013.01); *Y10T 137/8158* (2015.04)

(58) Field of Classification Search
USPC ......................................... 285/123.2–123.16
See application file for complete search history.

(56) References Cited

U.S. PATENT DOCUMENTS 5,054,523 A * 10/1991 Rink ............................. 137/377

\* cited by examiner

*Primary Examiner* — Aaron M Dunwoody
(74) *Attorney, Agent, or Firm* — Praxis (57) ABSTRACT

A versatile container a versatile pipe section comprising a sleeve and a tube inserted into the sleeve, the tube being held in place using a first capping element at a first end, at least one mounting element in a middle portion and a second capping element at a second end. The first and second capping elements are provided with an opening of a diameter corresponding to the diameter of the tube for allowing liquid or gas to flow through the tube. Also, a versatile container comprising a sleeve, at least one liquid or gas holding compartment adapted to be positioned within the sleeve, the at least one compartment being held in place using at least one mounting element. The sleeves are adapted to hold the contents of the tube or the at least one compartment in case of a leak.

19 Claims, 5 Drawing Sheets

VERSATILE CONTAINER AND PIPE

CROSS-REFERENCE TO RELATED APPLICATIONS

This application claims priority based on provisional application 60/486,258 filed Jul. 11, 2003 and is a continuation-in-part of U.S. patent application Ser. No. 11/819,846 filed on Jun. 29, 2007, which is a continuation-in-part of U.S. patent application Ser. No. 10/888,115 filed on Jul. 9, 2004, which are herein incorporated by reference.

TECHNICAL FIELD

The present disclosure relates to a versatile container and pipe but more particularly to a versatile container and pipe for use as tanks, reservoirs, hulls or pipelines.

BACKGROUND

Hot water tanks have not evolved much in many years. Whether they are gas, oil or electric, they are basically large reservoirs containing water and means for warming water. In the case of electric water tanks, a lower and an upper element alternate to keep the water evenly warm. An emergency vent on top handles high pressure while a drain at the bottom is used when emptying the tank.

Over the years, a variety of accessories have been developed to complement the features of a hot water tank such as timers to start and stop water heating as an energy saving feature and humidity alarms to detect water leaks and shut off water intake to the tank.

One problem remains with existing hot water tanks, containers and pipes is that they are subject to leaks, rusting/piercing/breaking.

Accordingly, there are many improvements to be brought to the hot water tanks, containers and pipes which already exist in order to palliate certain inefficiencies with these existing water tanks, containers and pipes and therefore, there is a need for improved hot water tank, containers and pipes.

SUMMARY

In a first embodiment, the disclosure generally relates to a versatile container, more particularly to a versatile container having a removable top lid. The container comprises a sleeve; at least one compartment housed within the sleeve, the compartment having walls for containing liquid or gas, and wherein the each compartment is removable from the container upon removal of the top lid. The sleeve can be sealed or not and has as its particularity that it can be extremely versatile and can have changeable compartments with heating means or not. The sleeve can be adapted to any existing or future compartments of any size or model, with or without heating means, and has the possibility of having one or many individual compartments being exchangeable upon rusting/piercing/breakage, instead of changing the complete container. The sleeve can also hold the entire contents of the at least one compartment, if it pierces. The sleeve can also possess a diversified array of sensors (for example water, fire, electricity, etc.) and a computer capable of cutting all energy, liquid, solids, gas or other sources, when, for example, the container leaks. There can also be a valve to empty the contents of the sleeve or the container when there is a leak. The computer can report a problem via Internet, telephone or other such means, to the insurance company, police, medical and/or fire department, shut off the energy, liquid, solids, gas or other sources until help arrives. The container according to the present disclosure can also have a plurality of interconnecting compartments which progressively warm up the liquid or gas by way of interconnecting pipes. As the heat loss from the lower compartments rises, the compartment on the top level recuperates the heat loss from the air from the middle and lower level compartments, so as to provide a more economical and ecological container.

The container can be sealed or not and it has as its particularity that it can be extremely versatile and can have changeable compartments with heating means or not. It may be adapted to any existing or future compartments of any size or model, with or without heating means, and having the possibility of having one or many individual compartments being exchangeable upon rusting/piercing/breakage instead of changing the complete container.

In the first embodiment, the versatile container includes a plurality of vertically stacked compartments which are lodged within a sleeve lining the container and providing increased insulation as well as a safety in case of leaks. The container, which can be sealed or not, and if sealed, it can be made airtight or the air can be replaced with a gas to increase its insulation properties. The vertically stacked compartments are linked together by interconnecting pipes. Furthermore, as the heat loss from the lower compartments rises, the compartment on the top level recuperates the hat loss from the middle and lower level compartments, so as to provide a more economical and ecological container by heating the liquid or gas in the upper-most compartment by convection. The container has a top removable lid which allows for the removal of the compartments so as to minimize the amount of disposable material (example: heating elements, heating means, compartments, etc.) and to facilitate the maintenance of the compartments and/or the sleeve, thus producing a more ecologically friendly container. Of course, such an advantage as a container with a top removable lid could be found on a single compartment container but would lose some of the advantages of a multi-compartment container. Optionally, features such as a humidity detector can warn of a leak and send a signal to electromechanically shut off the energy sources, liquid, solids, gas or other to the container. A timer or computer can also be programmed for partially or totally shut off heating at selected times. This system can also be used to shut off all kind of energy, liquid, solids, gas or other sources to the unit, when a problem arises; example, a compartment leaks. The computer will let know of the problem via the internet, and can be programmed by internet to correct the problem, or can contact by telephone, insurance company, police, medical and/or fire department, shut off the energy, liquid, solids, gas or other sources until help arrives.

One advantage of a multi-compartment container is that only one compartment needs to be heated to provide hot liquid or gas on demand during off peak hours, such as night time when water from other compartment could be left unheated in order to provide further energy savings while at the same time providing a quicker warm-up time since each compartment has its own heating means. Heating means generally refer to means of generating or transferring heat to water such as, but not limited to, electricity, gas, oil, wood, coal, combustible solids, solar, geothermal, nuclear and so forth. All the heating means can be activated at the same time there is constant demand for hot liquid or gas. However, it is not necessary to have heating means on all the compartments, as the top compartment recuperates the heat from the lower compartments via the air or the fitted pipes.

But this concept can also be applied to many other things such as any type of liquid or gas contained from leaking, like a double-walled pipeline or pipe, or even a container in or above ground, lakes, river and ocean or provided or a motor vehicle, a ship, a submarine, a plane or a rocket tank. This also applies to stopping the infiltration of gas, liquid or any contaminant. Another example of this concept is double-hulled boats or even submarines or tanker trucks that upon rupturing the outer hull, the inner hull will not be breached and allow anything to enter. Conversely, rupturing of the inner hull will not breach the outer hull.

The foregoing and other objects, features, and advantages of this disclosure will become more readily apparent from the following detailed description of a preferred embodiment of the disclosure with reference to the accompanying drawings, wherein the preferred embodiment of the disclosure is shown and described, by way of examples such as illustrating a specific number compartments whereas any two or more compartments are defined as 'multi-compartments'. As will be realized, the disclosure is capable of modifications in various obvious respects, all without departing from the spirit of the disclosure. Accordingly, the drawings and description are to be regarded as illustrative in nature, and not as restrictive.

Accordingly, there is provided a versatile pipe section, comprising:
 a sleeve; and
 a tube inserted into the sleeve, the tube being held in place using a first capping element at a first end, at least one mounting element in a middle portion and a second capping element at a second end, the first and second capping elements having an opening of a diameter corresponding to the diameter of the tube for allowing liquid or gas to flow through the tube;
wherein the sleeve is adapted to hold the contents of the tube in case of a leak.

There is also provided a versatile pipe section as above, wherein the tube is removable from the sleeve upon removal of the first and second capping elements.

There is further provided a versatile container, comprising:
 a sleeve;
 at least one liquid or gas holding compartment adapted to be positioned within the sleeve, the at least one compartment being held in place using at least one mounting element;
wherein the sleeve is adapted to hold the contents of the at least one compartment in case of a leak.

There is also provided a versatile container as above, wherein the sleeve comprises a removable lid, the at least one compartment being removable from the sleeve upon removal of the removable lid.

BRIEF DESCRIPTION OF THE FIGURES

Embodiments of the disclosure will be described by way of example only with reference to the accompanying drawings, in which.

Similar references used in different Figures denote similar components.

DETAILED DESCRIPTION

Figure 1:
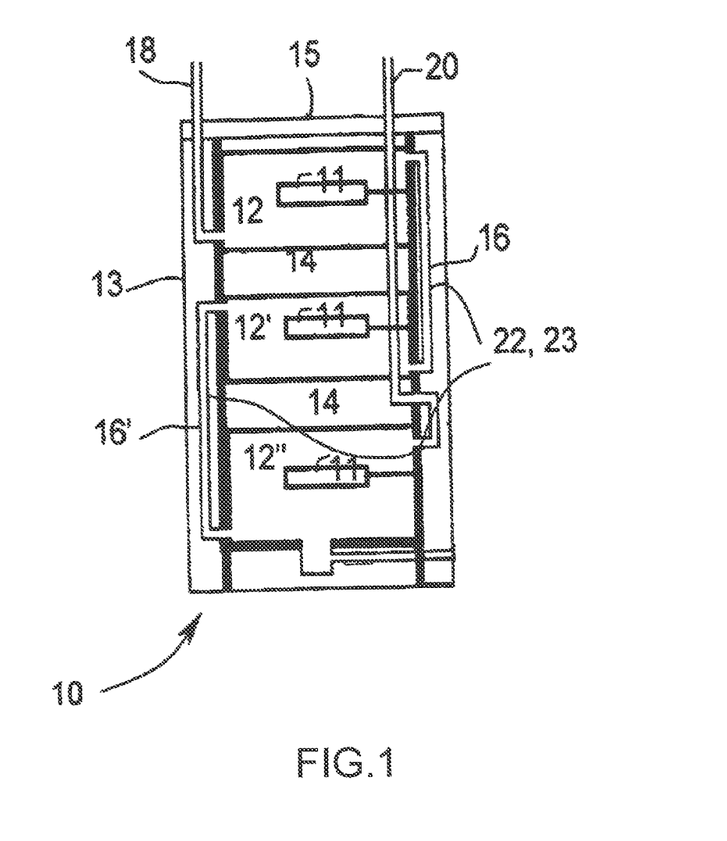
FIG. 1 is a side cutaway elevation of a first example of a versatile container in the form of a hot water tank in accordance with a first illustrative embodiment of the present disclosure.

Referring to FIG. 1, there is provided a first example of a versatile container in the form of a hot water tank (10). The hot water tank (10) includes a sleeve (13) in which are vertically stacked a plurality of compartments (12, 12', 12") spaced from each other by an air-tight space (14). The sleeve (13) is preferably hermetically sealed or air-tight. The sleeve (13) can adapt to any existing or future water container of any size or model, with or without heating means, and having the possibility of having individual or many water compartments being re-changeable upon rusting/piercing/breaking instead of completely changing the tank. The sleeve (13) can also contain or hold the entire contents of the hot water tank if the compartments (12, 12', 12") are pierced. Preferably also, there is a valve (28) to empty the contents when there is a hot water leak in the sleeve. Furthermore, the sleeve (13) may comprise a diversified array of sensors (29) (for example water, fire, electricity, etc.) and a computer (29) capable of cutting all energy, liquid, solids or gas or other sources, when a problem arises: for example, when a water container leaks. The computer can inform a user of a problem via internet, and the user can correct the problem remotely, or contact by telephone, insurance company, police, medical and/or fire departments as well as cut off all energy, liquid, solids or gas or other sources of the water tank (10) until help arrives. Optionally, features such as a humidity detector can warn of a leak and send a signal to electromechanically shut off the water supply to the tank (10). A timer, or the computer (29), can also be programmed to partially or totally shut off water heating at selected times.

The whole sleeve (13) could be sealed or not, and if sealed, it can be made air-tight and the air inside (30) can be changed to a gas to increase insulation. The air-tight space acts to increase the insulation properties of the compartments (12, 12', 12").

Each compartment may further be provided with one or more heating means (11). The compartments (12, 12'. 12") are interconnected by a connecting pipe (16, 16') of a diameter equivalent to a water inlet pipe (18') or a water outlet pipe (20) so that water can circulate between compartments (12, 12', 12") as fast as it can be taken in by the water inlet pipe (18) or taken out by the water outlet pipe (20). It is interesting to note that the connecting pipes (16, 16') may be contained within the compartments (12, 12', 12"), or, alternatively, may extend between the sleeve (13) and the compartments (12, 12', 12").

The tank (10) is also provided with a top removable lid (15). The lid (15) can be fastened onto the sleeve (13) by way of any type of mechanical fasteners adequate for securely attaching the lid (15) in a non-permanent manner so as to make it removable. The lid also allows for removal of the compartments (12, 12', 12") and the interconnected pipes (16, 16') with heating means or not so as to minimize the amount of disposal material, (example: heating elements, heating means, water containers, etc.) thus producing a more ecologically friendly hot water tank.

Figure 3:
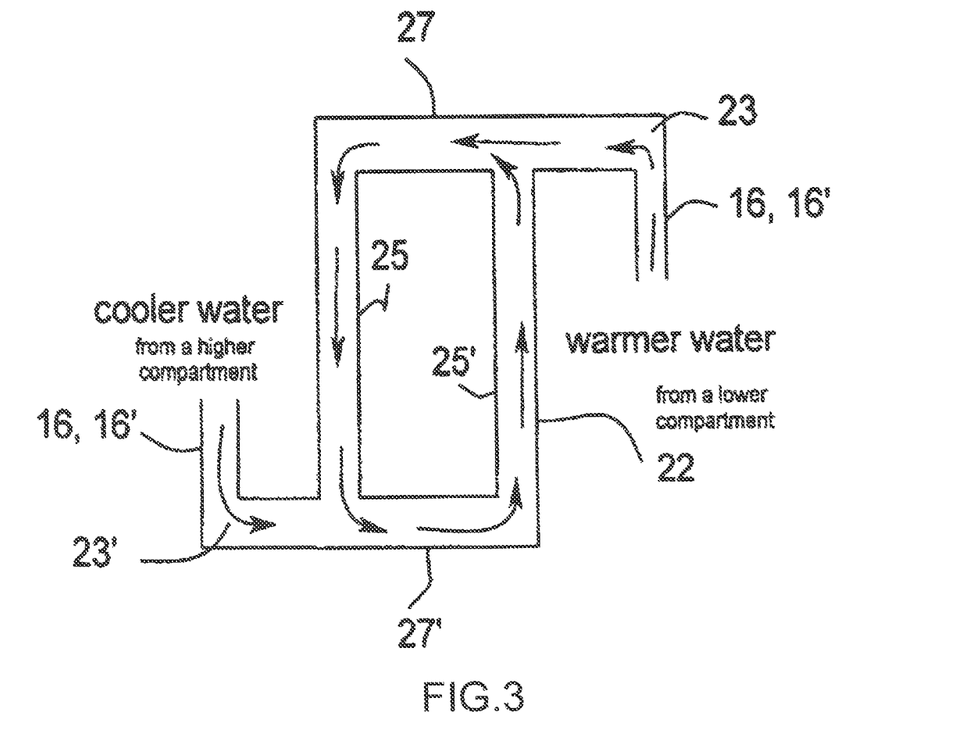
FIG. 3 is a side elevation of an example of a heat trap.

Cold water travels downward from the uppermost compartment (12) where it becomes warm, by way of the connecting pipe (16) to the middle compartment (12") where it becomes warmer. The water then travels to the lowermost compartment (12"), by way of the connecting pipe (16') where it is heated to a typical hot water tank temperature. From the lowermost compartment (12") it exits by the outlet pipe (20) for use. As shown in FIG. 3, to reduce water's tendency to migrate between compartments (12, 12', 12"), a heat trap (22) is set on connecting pipes (16, 16'). A heat trap (22) is designed to create an eddy which slows down water circulation, thus slowing down water migration. It consists of two ends (23, 23') interfacing with a pipe; in this case, the pipe is the connecting pipe (16, 16') which is sectioned off to allow insertion of the heat trap (22). The heat trap (22) is generally formed by two substantially parallel pipe segments (25, 25') and joining segments (27, 27').

When a user uses hot water, the water will be taken from the lowermost compartment (12") which will require water from the middle compartment (12') to replenish it. Therefore, water in the connecting pipes (16, 16') will travel from a higher compartment, either the uppermost compartment (12) or the middle compartment (12'), towards a lower compartment, either the middle compartment (12') or the lowermost compartment (12") respectively. However, when no one uses the water, warmer water will tend to migrate, by way of the connecting pipes (16, 16'), from the lower compartments, where it is warmer, to higher compartments, where it is cooler. In order to slow down the migration, a heat trap (22) is placed within the path of the connecting pipe (16, 16'). Because of the two paths water can take in the pipe segments (25, 25'), along with the direction as indicated by the arrows, an eddy is created by conflicting tendencies of water having different temperatures. For example, warm water does not want to travel downwards as it is forced to do in the pipe segment (25) but it wants to go up as it does in the pipe segment (25'), which creates an eddy which in turn tends to draw cooler water rather than letting warmer water migrate towards cooler water. There is still transfer of heat but it is slowed down.

As such, one advantage of a multi-compartment tank is that only one compartment needs to be heated to provide hot water on demand during off peak hours, such as night time when water from other compartments could be left unheated in order to provide further energy savings while at the same time providing a quicker warm up time since each compartment has its own heating means. Heating means generally refer to means of generating or transferring heat to water such as, but not limited to, electricity, gas, oil, wood, coal, combustible solids, solar, geothermal, nuclear and so forth. All the heating means can be activated at the same time when there is a constant demand for hot water. However, it is not necessary to have heating means on all the water containers, as the top container recuperates the heat from the lower compartments via the air-tight space (14) surrounding the compartments or the fitted pipes.

The heat trap (22) can be used on standard hot water tanks as well as any type of plumbing where heat transfer needs to be slowed down and can therefore have applications well beyond the application discussed in this instant disclosure.

Figure 2:
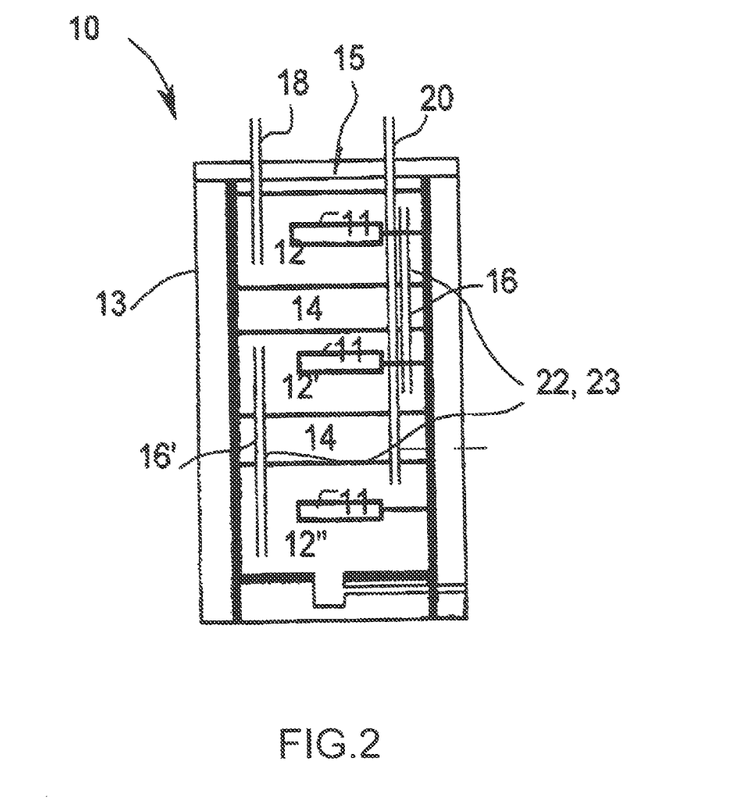
FIG. 2 is a side cutaway elevation of a second example of a versatile container in the form of a hot water tank in accordance with the first illustrative embodiment of the present disclosure.

Referring now to FIG. 2, there is provided a second example of a versatile container in the form of a hot water tank (10), which can include the heat traps (22) but where the connecting pipes (16, 16') run inside the compartments (12, 12', 12") instead of outside of as per the first example shown in FIG. 1.

But this concept can also be applied to many other things such as any type of liquid or gas contained from leaking, like a double-walled pipeline or pipe, or even a tank or container in or above ground, lakes, river and ocean. This also applies to stopping the infiltration of gas, liquid or any contaminant. Another example of this concept is double-hulled boats or even submarines or tanker trucks that upon rupturing the outer hull, the inner hull will not be breached and not allow anything to enter. Conversely, rupturing of the inner hull will not breach the outer hull.

Figure 4:
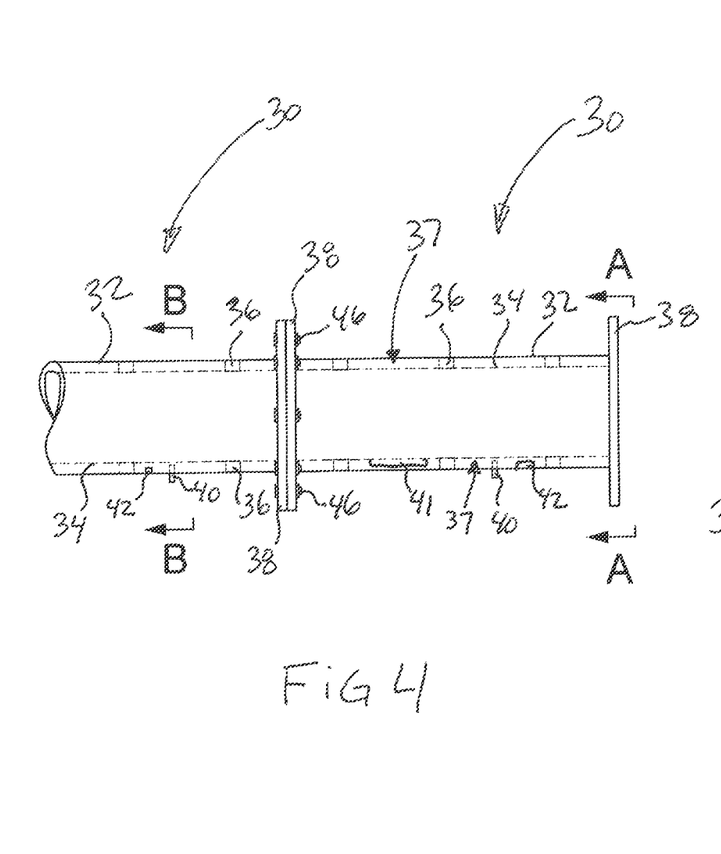
FIG. 4 is a side view of an example of a versatile pipe in the form of a pipeline in accordance with a second illustrative embodiment of the present disclosure.
Figure 4A:
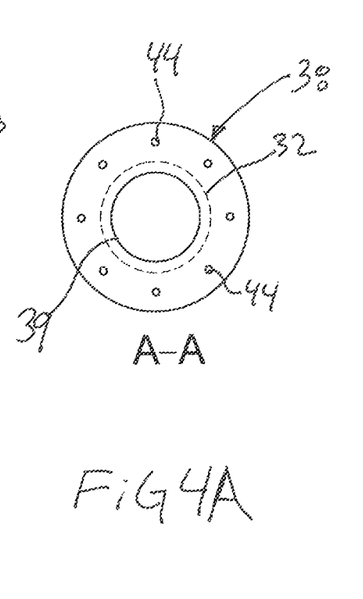
FIGS. 4A and 4B are cross-sections of the versatile pipe of FIG. 4 sectioned, respectively, along lines A-A and B-B.
Figure 4B:
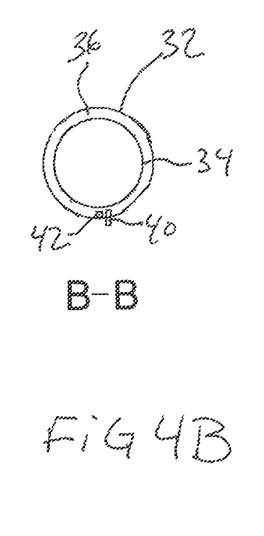

Referring now to FIGS. 4, 4A and 4B, there is provided a versatile pipe in the form of pipeline formed of multiple pipeline sections (30) in accordance with a second illustrative embodiment of the present disclosure. The pipeline section (30) includes a sleeve (32) in which is inserted a tube (34) held in place using one or more mounting elements (36) and, at each end, a capping element (38) forming a flange. Each capping element (38) has an opening (39) of a diameter corresponding to the diameter of the tube (34), thus allowing liquid or gas to flow from one pipeline section (30) to another when joined, and forming an space (37). The whole sleeve (32) can be sealed or not, and if sealed, it can be made air-tight and the air inside space (37) can be changed to a gas to increase the insulation properties of the tube (34), which may further be provided with a heater, cooler or other temperature regulating mechanism (41).

In the illustrative embodiment the mounting elements (36) circle the tube (34) in order to support the weight of a liquid, for example petrol, being transported therein. However, in the case where the pipeline section (30) is used to transport a gas or is of small dimension, the mounting elements (36) may be spaced around the perimeter of the tube (34) and not circle it completely. It is to be understood that the number, dimensions and spacing of the mounting elements (36) will depend on the dimensions of the pipeline section (30) and the liquid or gas being transported therein. The mounting elements (36) may hold the tube (34) in place permanently, for example by soldering the mounting elements (36) to the tube (34) and the sleeve (32), or removably, for example by soldering the mounting elements (36) to either of the tube (34) or the sleeve (32), thus allowing the replacement of the tube (34) (once the capping elements (38) are removed) upon rusting/piercing/breaking instead of completely changing the pipeline section (30).

The sleeve (32) may be provided with a valve (40) to empty its contents when there is a leak in the tube (34). Furthermore, the sleeve (32) may comprise a diversified array of sensors (42), for example liquid or gas detectors, configured to inform an operator of a problem such as a leak via a wired or wireless communication link. Advantageously, if a valve (40) and/or sensors (42) are provided, the mounting elements (36) may be perforated or include openings so as to allow displacement of any leaked liquid or gas within the air-tight space (37).

Individual pipeline sections (30) are connected together by abutting respective capping elements (38) with a washer therebetween and bolting them into place, the capping elements (38) being provided with bolt or rivet holes (44) along its flange for the use of securing bolts or rivets (46). It is to be understood that in alternative embodiments the capping elements (38) may be provided with a connector other than a flange and that other techniques, mechanisms and means know in the art may be used to interconnect pipeline sections (30), allowing individual pipeline sections (30) to be replaced. It is also to be understood that individual pipeline sections (30) can also be permanently interconnected.

It is also to be understood that although reference has been made to pipeline sections, the preceding can also apply to smaller diameter pipes, for example water mains or household piping.

Figure 5:
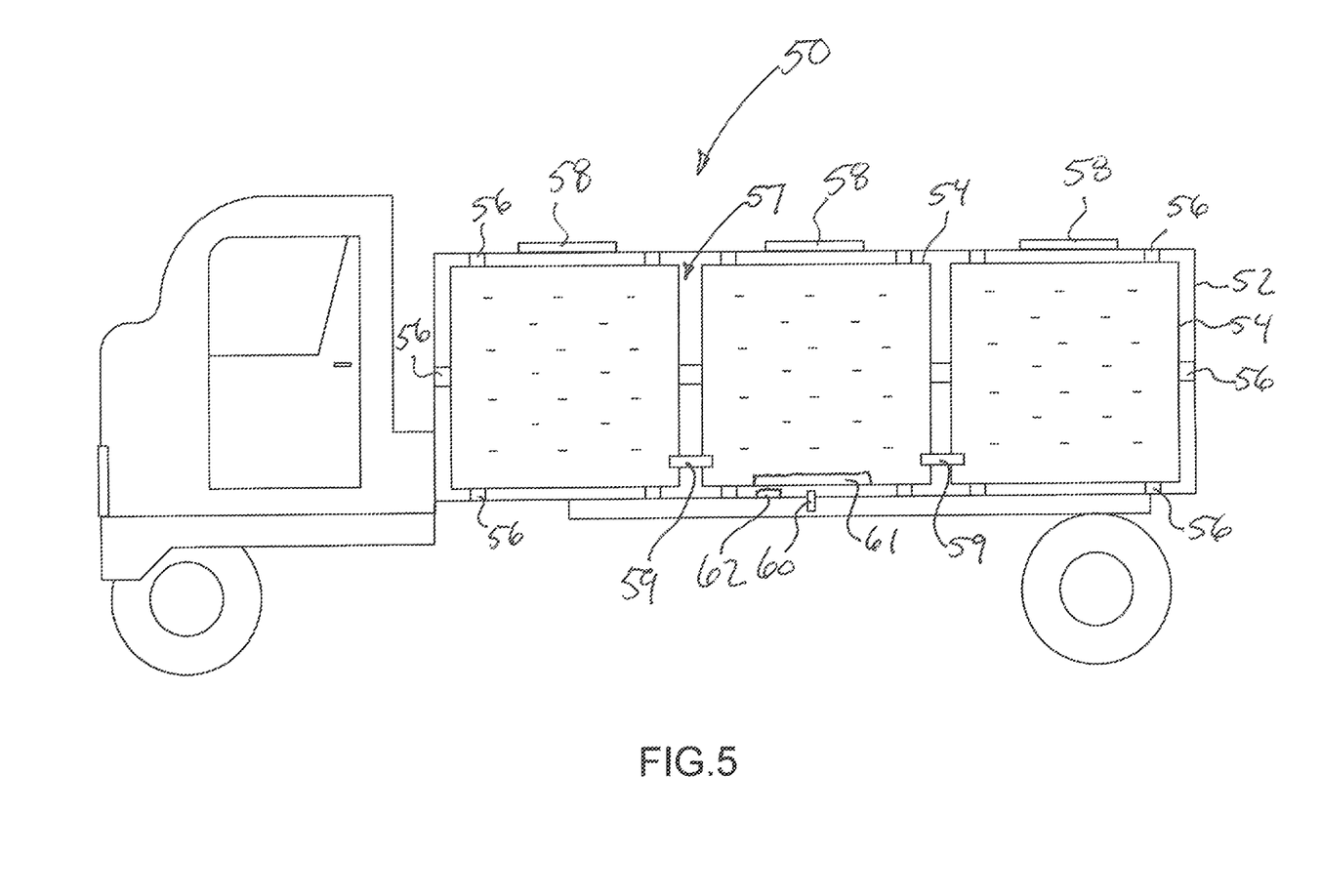
FIG. 5 is a side cutaway elevation of an example of a versatile container in the form of a tanker in accordance with a third illustrative embodiment of the present disclosure.

Referring to FIG. 5, there is provided a versatile container in the form of a tanker (50) in accordance with a third illustrative embodiment of the present disclosure. The tanker (50) includes a sleeve (52) in which are positioned a one or more compartments (54) held in place using one or more mounting elements (56), each compartment (54) having an associated access hatch, valve or other access mechanism (58) providing access therein. It is to be understood that an alternative embodiment each compartment (54) may be provided with multiple access mechanisms. The whole sleeve (52) can be sealed or not, and if sealed, it can be made air-tight and the air inside space (57) can be changed to a gas to increase the insulation properties of the compartments (54). One or more of the compartments (54) may further be provided with a heater, cooler or other temperature regulating mechanism (61).

In the illustrative embodiment the mounting elements (56) conform to the geometry of the compartments (54) and the sleeve (52) in order to support the weight of a liquid, for example petrol, being transported therein. However, in the case where the tanker (50) is used to transport a gas, the mounting elements (56) may be spaced around the perimeter of the compartments (54) and conform to it completely. It is to be understood that the number, dimensions and spacing of the mounting elements (56) will depend on the dimensions of the tanker (50) and the liquid or gas being stored therein. The mounting elements (56) may hold the compartments (54) in place permanently, for example by soldering the mounting elements (56) to the compartments (54) and the sleeve (52), or removably, for example by soldering the mounting elements (56) to either of the compartments (54) or the sleeve (52), thus allowing the replacement of the compartments (54) upon rusting/piercing/breaking. Optionally, two or more of the compartments (54) may be interconnected by connecting pipes (59), which may also be provided with remote control valves, for the distribution of the liquid or gas amongst the compartments (54) especially in applications where the distribution of weight is important.

The tanker (50) may also be provided with a removable lid (55). The lid (55) can be fastened onto the sleeve (52) by way of any type of mechanical fasteners adequate for securely attaching the lid (55) in a non-permanent manner so as to make it removable. The lid (55) also allows for removal of the compartments (54) and the interconnected pipes (59), if present, so as to minimize the amount of disposal material, thus producing a more ecologically friendly tanker.

The sleeve (52) may be provided with a valve (60) to empty its contents when there is a leak in one of the compartments (54). Furthermore, the sleeve (52) may comprise a diversified array of sensors (62), for example liquid or gas detectors, configured to inform an operator of a problem such as a leak via a wired or wireless communication link. Advantageously, if a valve (60) and/or sensors (62) are provided, the mounting elements (56) may be perforated or include openings so as to allow displacement of any leaked liquid or gas within the air-tight space (57). In an alternative embodiment, partitions may be added to segregate the air-tight space (57) for two or more of the compartments (54), in which case each segregated air-tight space (57) may be provided with associated valve (60) and/or sensors (62).

It is to be understood that although reference has been made to a tanker, the preceding can also apply to other types of liquid or gas tanks, for example a motor vehicle, a ship, a submarine, a plane or a rocket tank, as well as in or above ground reservoirs.

It is further to be understood that the preceding can also apply to hulls, providing ships with a double-hull having either a single or a plurality of segregated compartments, either longitudinally aligned in a single line or in a plurality of parallel lines. In the double-hull embodiment, protection is provided for internal punctures or leaks in one of the compartments, for example in the case of a tanker ship, as well as protection from external punctures of the hull. In this embodiment, the valve (60) may be replaced by a pump to pump any liquid or gas accumulated in the air-tight space (57).

Although the present disclosure has been described with a certain degree of particularity and by way of an illustrative embodiments and examples thereof, it is to be understood that the present disclosure is not limited to the features of the embodiments described and illustrated herein, but includes all variations and modifications within the scope and spirit of the disclosure as hereinafter claimed.

What is claimed is:

1. A versatile double-walled pipe section, comprising:
   a sleeve; and
   a tube inserted into said sleeve, said tube being held in place using a first capping element at a first end, at least one mounting element in a middle portion, said at least one mounting element encircling said tube and having openings so as to allow displacement of liquid or gas, and a second capping element at a second end, said first and second capping elements having an opening of a diameter corresponding to the diameter of said tube for allowing liquid or gas to flow through said tube;
   wherein said sleeve is adapted to hold the contents of said tube in case of a leak.

2. The versatile double-walled pipe section of claim 1, wherein said tube is removable from said sleeve upon removal of said first and second capping elements.

3. The versatile double-walled pipe section of claim 1, wherein said sleeve forms an air-tight space, said air-tight space being filled with an insulating gas.

4. The versatile double-walled pipe section of claim 1, wherein said tube is provided with a temperature regulating mechanism.

5. The versatile double-walled pipe section of claim 1, further comprising a valve to empty the contents of said sleeve.

6. The versatile double-walled pipe section of claim 1, further comprising at least one sensor for detecting a leak, said at least one sensor being configured to inform an operator of said leak via a communication link.

7. The versatile double-walled pipe section of claim 6, wherein said communication link is selected from a group consisting of a wired and a wireless communication links.

8. The versatile double-walled pipe section of claim 1, wherein said capping elements are provided with a connector for interconnecting said pipe section with another of said pipe section.

9. The versatile double-walled pipe section of claim 8, wherein said connector is a flange configured for use with securing bolts.

10. The versatile double-walled pipe section of claim 1, wherein said at least one mounting element is soldered to at least one of said sleeve and said tube.

11. A versatile double-walled pipe section comprising:
a sleeve; and
a tube inserted into said sleeve, said tube being held in place using a first capping element at a first end, at least one mounting element in a middle portion, said at least one mounting element being spaced around the perimeter of said tube and being is soldered to at least one of said sleeve and said tube, and a second capping element at a second end, said first and second capping elements having an opening of a diameter corresponding to the diameter of said tube for allowing liquid or gas to flow through said tube;
wherein said sleeve is adapted to hold the contents of said tube in case of a leak.

12. The versatile double-walled pipe section of claim 11, wherein said tube is removable from said sleeve upon removal of said first and second capping elements.

13. The versatile double-walled pipe section of claim 11, wherein said sleeve forms an air-tight space, said air-tight space being filled with an insulating gas.

14. The versatile double-walled pipe section of claim 11, wherein said tube is provided with a temperature regulating mechanism.

15. The versatile double-walled pipe section of claim 11, further comprising a valve to empty the contents of said sleeve.

16. The versatile double-walled pipe section of claim 11, further comprising at least one sensor for detecting a leak, said at least one sensor being configured to inform an operator of said leak via a communication link.

17. The versatile double-walled pipe section of claim 16, wherein said communication link is selected from a group consisting of a wired and a wireless communication links.

18. The versatile double-walled pipe section of claim 11, wherein said capping elements are provided with a connector for interconnecting said pipe section with another of said pipe section.

19. The versatile double-walled pipe section of claim 18, wherein said connector is a flange configured for use with securing bolts.

* * * * *